US010222944B1

(12) United States Patent
Hicklin et al.

(10) Patent No.: US 10,222,944 B1
(45) Date of Patent: Mar. 5, 2019

(54) EMBEDDING USER INTERFACE ELEMENTS IN DOCUMENTS CONTAINING CODE

(71) Applicant: The MathWorks, Inc., Natick, MA (US)

(72) Inventors: Joseph F. Hicklin, Wayland, MA (US); Joseph R. Bienkowski, Ashland, MA (US); John W. Glass, Franklin, MA (US); Edward W. Gulley, Watertown, MA (US); Claudia G. Wey, Wayland, MA (US); Jeng-Tsung Tsai, Framingham, MA (US); Chen Su, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 524 days.

(21) Appl. No.: 15/052,464

(22) Filed: Feb. 24, 2016

(51) Int. Cl.
*G06F 3/048* (2013.01)
*G06F 3/0482* (2013.01)
*G06F 3/0484* (2013.01)

(52) U.S. Cl.
CPC ........ *G06F 3/0482* (2013.01); *G06F 3/04842* (2013.01)

(58) Field of Classification Search
CPC ...... G06F 3/048; G06F 3/0481; G06F 3/0482; G06F 3/0484; G06F 8/20; G06F 8/24; G06F 8/34; G06F 8/38; G06F 9/44; G06F 9/4443
See application file for complete search history.

(56) References Cited

U.S. PATENT DOCUMENTS

| 5,862,395 A * | 1/1999 | Bier ...................... G06F 3/0481 712/1 |
| 9,645,797 B2 * | 5/2017 | Savliwala ......... G06F 17/30867 |
| 2014/0047413 A1 * | 2/2014 | Sheive .................. H04L 65/403 717/110 |
| 2017/0116179 A1 * | 4/2017 | Gagne-Langevin .... G06F 17/24 |

OTHER PUBLICATIONS

Wolfram, "Wolfram Mathematica," https://www.wolfram.com/mathematica/, Jul. 9, 2014, 5 pages.
Wolfram, "Wolfram|Alpha Widgets," http://www.wolframalpha.com/widgets/, May 26, 2011, 1 page.
IPython, "The IPython Notebook," http://ipython.org/notebook.html, Apr. 22, 2015, 4 pages.

* cited by examiner

*Primary Examiner* — Xiomara L Bautista
(74) *Attorney, Agent, or Firm* — Harrity & Harrity, LLP

(57) ABSTRACT

A device may provide a user interface element for display in association with a displayed document that contains code. The user interface element may be associated with at least one adjustable state. The device may determine, based on a user interaction with the user interface element, a selected state of the at least one adjustable state of the user interface element. The device may generate information based on the selected state of the user interface element. The device may store the user interface element, the selected state of the user interface element, and the information in association with the document.

20 Claims, 15 Drawing Sheets

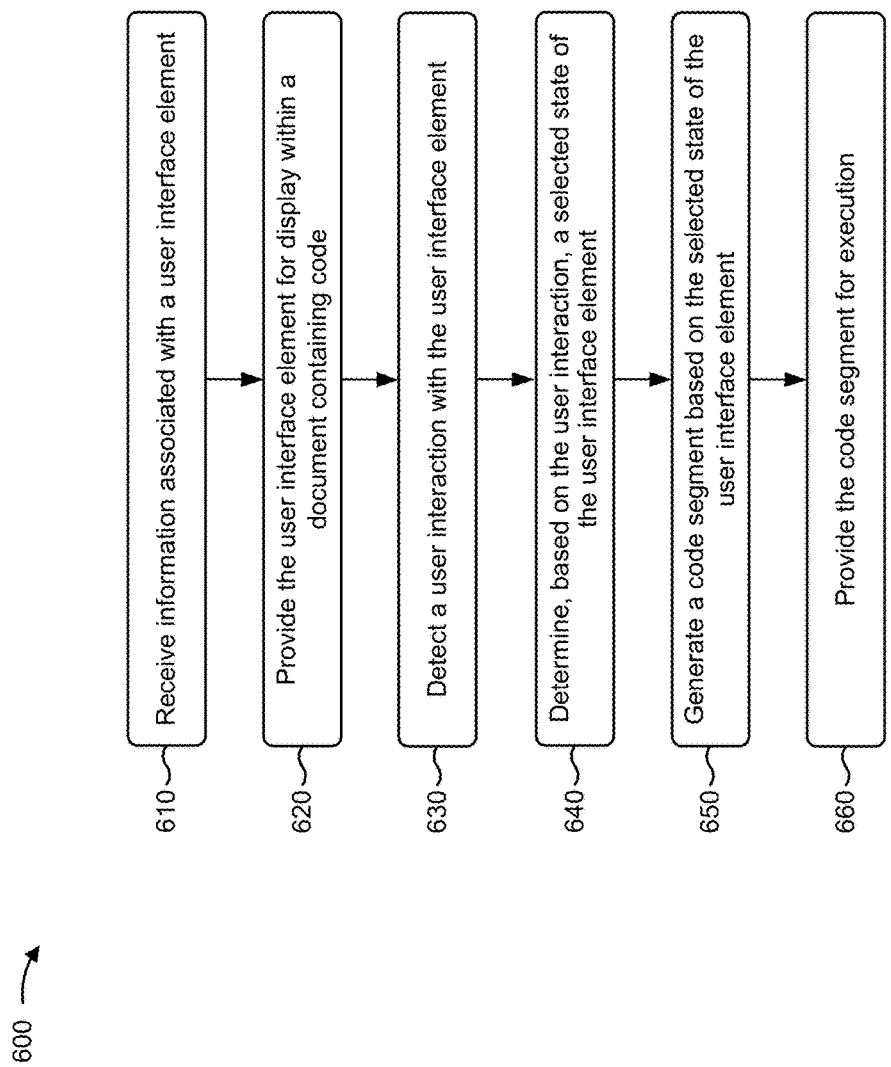

US 10,222,944 B1

EMBEDDING USER INTERFACE ELEMENTS IN DOCUMENTS CONTAINING CODE

BRIEF DESCRIPTION OF THE DRAWINGS

FIG. 6 is a flow chart of an example process for embedding user interface elements in documents containing code.

DETAILED DESCRIPTION

Figure 1A:
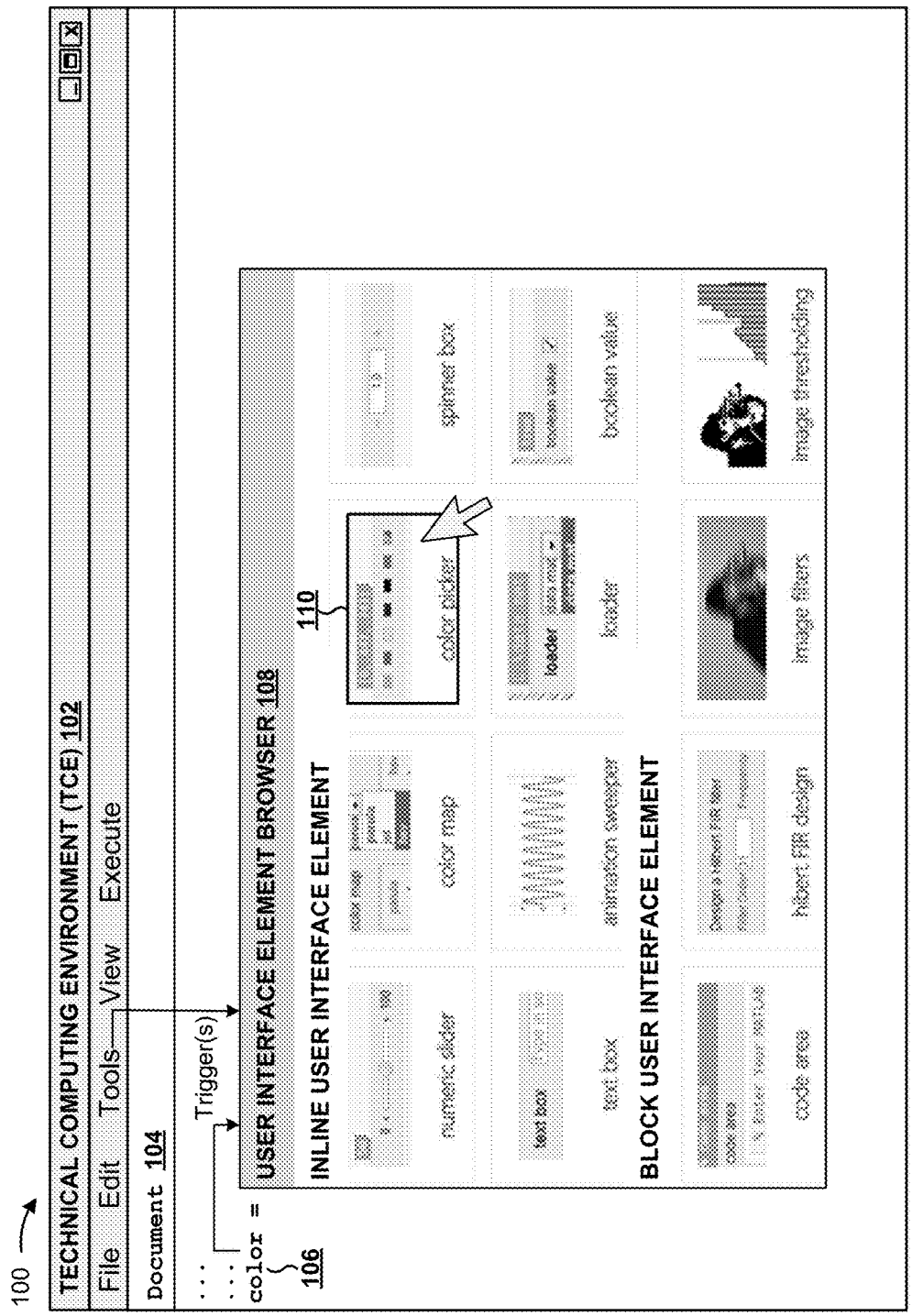
FIGS. 1A-1J are diagrams of an overview of an example implementation described herein.

The following detailed description of example implementations refers to the accompanying drawings. The same reference numbers in different drawings may identify the same or similar elements.

In computer programming, a processor can perform a functionality, e.g., carrying out calculations or generating plots, when program code is executed. The program code can be handwritten (e.g., by a computer programmer) in a document of a programming environment (e.g., a code document, a document containing code, etc.). However, writing code can be difficult, time consuming, and error prone. In some implementations, one or more user interface (UI) elements (e.g., graphical user interface (GUI) elements) are provided to a user (e.g., a computer programmer) for embedding in a document that contains program code. Each UI element can represent one or more functionalities that the user intends to have the processor(s) perform. Once embedded in the document, the program represented by the document can be executed. This program may include elements contributed by the UI element, which may be executed with or without additional programming code in the document, to perform the intended functionalities. Embedding the UI elements can eliminate the need for the user to write code for the intended functionalities. The UI elements can be in a form that allows the user or a reader of the document to readily understand the functionalities performed by the UI elements without having to know the particular details of the code underlying the UI elements. For example, a UI element may perform data filtration functionality and the icon of the UI element may contain the word "filter."

In some implementations, the UI elements can be provided to a user upon user request or automatically, such as, during the user's creating of code in the document. For example, one or more UI elements can be triggered to be displayed to a user based on live analysis of the code created by the user at the time the user creates the code. One or more of the displayed UI elements can be selected by the user (e.g., by clicking or dragging) to be embedded into a desired location of the document. The UI elements may carry or be triggered to generate information for use by the processor(s) to perform the corresponding functionalities. For example, the information may include code or other information associated with code, which may be executed or used to perform the functionalities. For example, the information may include executable content. The information can be concealed from the user so the document remains clean and orderly. The information can also be exposed to the user or explicitly imported into the document so that the user can make changes to the information. Examples of the information include source code (e.g., MATLAB code, C code, C++ code, or Java code), executable binary code, a link to external code, a link (e.g., a URL) to a service capable of performing the underlying functionality, or the like. In some implementations, selecting, embedding, or executing a UI element triggers automatic code generation by a code generator in communication with the UI element.

Once embedded (e.g., selected, loaded, and saved) in a document, a UI element can be persistently stored in the document. For example, when the document is saved, closed, and reopened at a later time, the UI element exists at the embedded location in the reopened document, as does the code written and saved in the document. In some implementations, the information (e.g., the generated code, a link to external code, etc.) associated with the UI element is also persistently stored in the document. In some implementations, during edit time, the programming environment in which the document is generated may establish linkages between information associated with an embedded UI element and the existing code in the document. For example, when the information contains a function name with its arguments, values provided in the code may be linked to the corresponding arguments. During edit time, the programming environment may also process the embedded UI element(s) and the code to perform tasks and generate features, such as a function call with appropriate arguments. For example, a user interface may be designed to generate a function call with the appropriate arguments. As an example, the function call may provide a line fit to a set of data. The user interface may run other code that runs that function or some other code (e.g., an optimization function, etc.) to generate a set of potential fits that the user can visually inspect. The user can than choose the fit that looks best. That selection may trigger the actual code generation of the function call to occur in the document. Examples of tasks can include curve fitting, image processing, code optimization, or the like. In some implementations, the generated features can be stored (e.g., persistently stored) with the UI in the document so that the features can be used, without needing to be regenerated, during execution time (which sometimes can also be called run time) of the document. Using the edit-time generated features, the execution of the document can be efficient.

FIGS. 1A-1J are diagrams of an overview of example implementation 100 described herein. In the examples shown in FIGS. 1A-1J, the programming environment is a technical computing environment (TCE) 102. Additionally, a document 104 may be displayed within TCE 102 on a screen associated with a device (e.g., a client device, a server device, etc.). In some implementations, a device (e.g., a client device, or the like), local to the user, may host TCE 102 and/or document 104 (e.g., a document containing code). Additionally, or alternatively, another device (e.g., a server device, or the like) may host TCE 102 and/or document 104, and may provide access to TCE 102 and/or document 104 (e.g., may provide a client device with access to TCE 102 and/or document 104).

In some implementations, a user may interact with TCE 102 using an input mechanism (e.g., a keyboard, a touch screen keyboard, a mouse, a touch screen, a touch pad, or the like). For example, a user may interact with TCE 102 to write, modify, etc. one or more lines of code. For example, as shown in FIG. 1A, assume that a user writes code 106 (e.g., "color="). TCE 102 may provide a user interface element to assist a user with generating information (e.g., a code segment, a link to external code, etc.) associated with code 106, as described below. For example, TCE 102 may provide a color picker user interface element to permit a user to select a color to be represented by the variable color.

In some implementations, TCE 102 may provide a user interface element browser 108 for display based on one or more triggers. For example, TCE 102 may provide user interface element browser 108 for display based on a user interaction with an input mechanism associated with TCE 102 (e.g., a button, a menu, a menu item, etc.). For example, the user may select a menu associated with TCE 102 (e.g., a "Tools" menu) and/or may select a menu item included in the menu. TCE 102 may provide user interface element browser 108 based on the user selection of the menu and/or the menu item, for example.

Additionally, or alternatively, TCE 102 may provide user interface element browser 108 for display based on a user interaction with one or more lines of code, a parameter, a value, or the like. For example, assume that a user interacts with code 106 (e.g., double-clicks, highlights, selects, right-clicks and selects a menu item, etc.). TCE 102 may provide user interface element browser 108 based on the user interaction with code 106, for example.

Additionally, or alternatively, TCE 102 may infer, based on a set of rules, that user interface element browser 108 is to be provided for display. For example, a user may input a particular string of characters, particular code, or the like, that satisfies a set of rules, and TCE 102 may provide user interface element browser 108 for display based on the set of rules being satisfied. For example, TCE 102 may infer, based on a user writing code 106, that user interface element browser 108 is to be provided for display. For example, as shown in FIG. 1A, assume that TCE 102 provides user interface element browser 108 for display based on user input of a variable (e.g., color) and an assignment operator (e.g., an equals sign).

In some implementations, user interface element browser 108 may include one or more icons 110 associated with one or more user interface elements (e.g., a numeric slider, a color map, a color picker, a spinner box, a text box, an animation sweeper, a loader, a Boolean value, a code area, a Hilbert Finite Impulse Response (FIR) filter, an image filter, an image thresholder, or the like). In some implementations, TCE 102 may determine one or more icons 110 to be displayed in user interface element browser 108 based on one or more lines of code, a parameter, a value, etc. For example, assume that a user writes code 106. TCE 102 may determine one or more icons 110 to be displayed in user interface element browser 108 based on code 106, for example.

In some implementations, TCE 102 may determine a user interface element to embed in document 104. For example, TCE 102 may determine a user interface element to embed based on a user interaction with an icon 110 (e.g., based on a user selecting an icon 110, clicking an icon 110, or the like). For example, assume that the user selects icon 110 associated with a color picker user interface element (e.g., using an input mechanism, such as a mouse, or the like). In some implementations, the icon may represent the user interface element, and may be a limited view of the user interface element without full functionality of the user interface element. TCE 102 may embed a color picker user interface element in document 104 based on the user selection. Additionally, or alternatively, TCE 102 may determine a user interface element to embed in document 104 based on an inference. For example, TCE 102 may determine a user interface element to embed based on a user inputting a particular string of characters, particular code, etc.

Figure 1B:
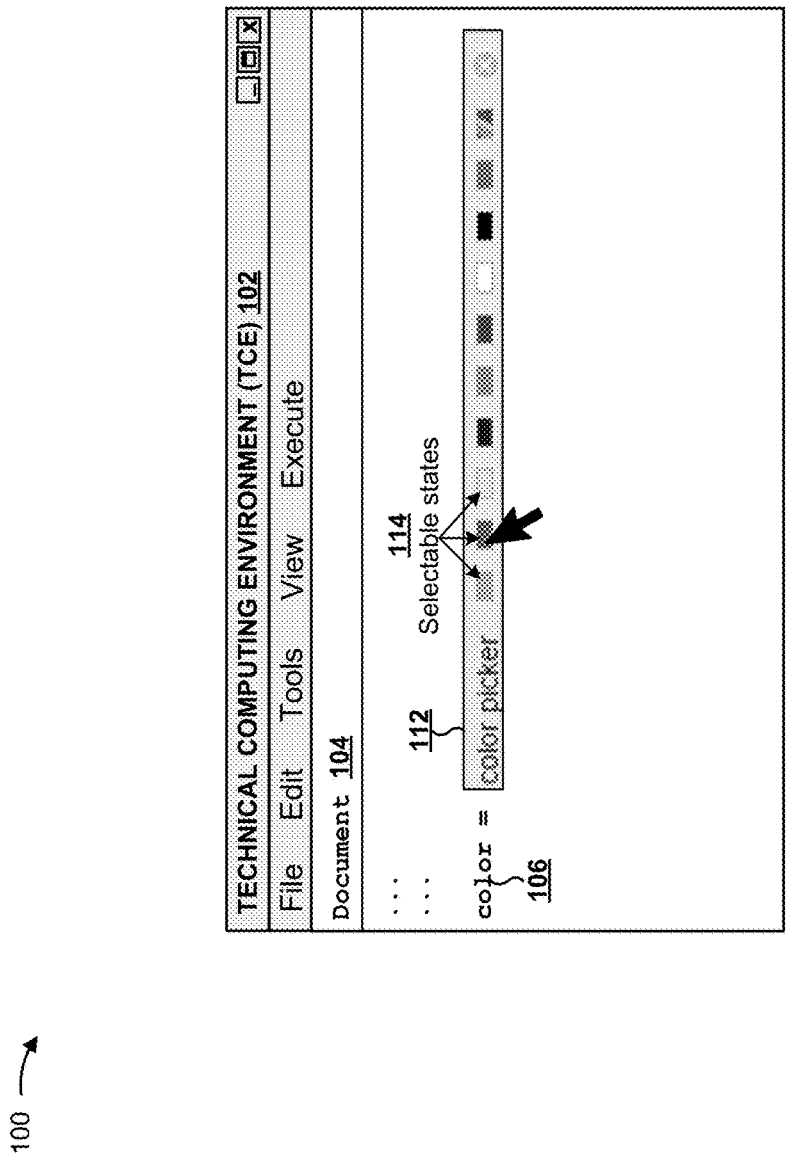

As shown in FIG. 1B, TCE 102 may embed a user interface element 112 in document 104. For example, TCE 102 may embed color picker user interface element 112 in document 104 based on a user selecting icon 110. In some implementations, a user interface element 112, when selected, embedded, and/or executed, may generate information (e.g., code, such as MATLAB code, C code, C++ code, Java code, executable binary code, etc.; a link to external code; or the like). In this way, user interface element 112 may generate information for use by a device (e.g., a client device, or the like) to perform a corresponding functionality.

In some implementations, user interface element 112 may be embedded at a particular location in document 104. For example, TCE 102 may provide user interface element 112 within document 104, in-line with code included in document 104. For example, as shown in FIG. 1B, TCE 102 may provide color picker user interface element 112 on a particular line of code (e.g., in association with code 106). In some implementations, TCE 102 may provide information generated by color picker user interface element 112 on the particular line of code (e.g., instead of color picker user interface element 112 and/or in addition to color picker user interface element 112).

In some implementations, TCE 102 may provide a block user interface element within document 104 (e.g., shown in FIG. 1A as code area user interface element, Hilbert FIR user interface element, etc.). For example, a block user interface element may be associated with multiple lines of code and/or may generate information (e.g., code segments, parameters, values, etc.) associated with multiple lines of code.

In some implementations, user interface element 112 may be associated with multiple selectable states 114 (e.g., adjustable states of user interface element 112) which may generate information (e.g., code segments, or the like). For example, each selectable state 114 may correspond to information that is capable of being generated via user interface element 112. Different selectable states 114 may correspond to different information (e.g., code segments, or the like). In this way, when a user interacts with a user interface element 112 to select a selectable state 114, the user interface element 112 may generate information corresponding to the selected state.

For example, color picker user interface element 112 may be associated with multiple selectable states 114, shown as different colors that a user is permitted to select. The user may select a particular color, and color picker user interface element 112 may generate information that represents the selected color (e.g., a matrix value, a red-green-blue (RGB) value, a numeric value that represents a color, or the like). Further, user interface element 112 may provide visual feedback based on a user selection of a selectable state (e.g., by highlighting, outlining, or otherwise providing a visual indication of the selected state). Additionally, or alternatively, user interface element 112 may provide a visual representation of a result associated with a selected state (e.g., a preview of an image that is edited based on user selection of a selectable state, or the like).

Other examples of selectable states 114 include states that correspond to a variable value (e.g., a numeric value) based on user interaction with a slider interface element of user interface element 112, states that correspond to different function parameters (e.g., filtering parameters of a filter function), states selectable from a color map, states selectable from a spinner box, states selectable based on input provided via a text box (e.g., a string value), states corresponding to Boolean values (e.g., based on a checkbox, a radio button, etc.), or the like.

In some implementations, selection of a state of user interface element 112 may take place during edit-time, and execution of the code generated via user interface element 112 may take place during run-time. Intermediate or out-of-band code, generated by user interface element 112, may include code that is executed during edit-time to assist with generating in-band code that is executed during run-time. For example, out-of-band code may be generated and/or executed during edit-time to show a result of selecting a particular state of user interface element 112, and the result may be provided for display to the user. The user may modify a selected state until the user is satisfied with the result, at which point the user may provide input that causes in-band code to be generated and included in document 104 for execution during run-time. By separating edit-time events from run-time events, a device may conserve computing resources, such as memory resources, processing resources, or the like, by avoiding repetition, at run-time, of calculations made at edit-time. Further, the device may assist the user with code generation, which may reduce errors. Further, the device may leverage idle process time by permitting a user to make a more informed decision much more easily, which reduces future syntactic or logical errors during run-time. In some implementations, code may be executed during edit-time, and a result of this execution may be stored in association with user interface element 112 and/or document 104. During run-time, the result may be used, thereby conserving processing resources and resulting in faster run-time execution. Typically, run-time is more time-constrained than edit-time, so it is beneficial to execute code during edit-time and re-use a result of the execution at run-time.

Figure 1C:
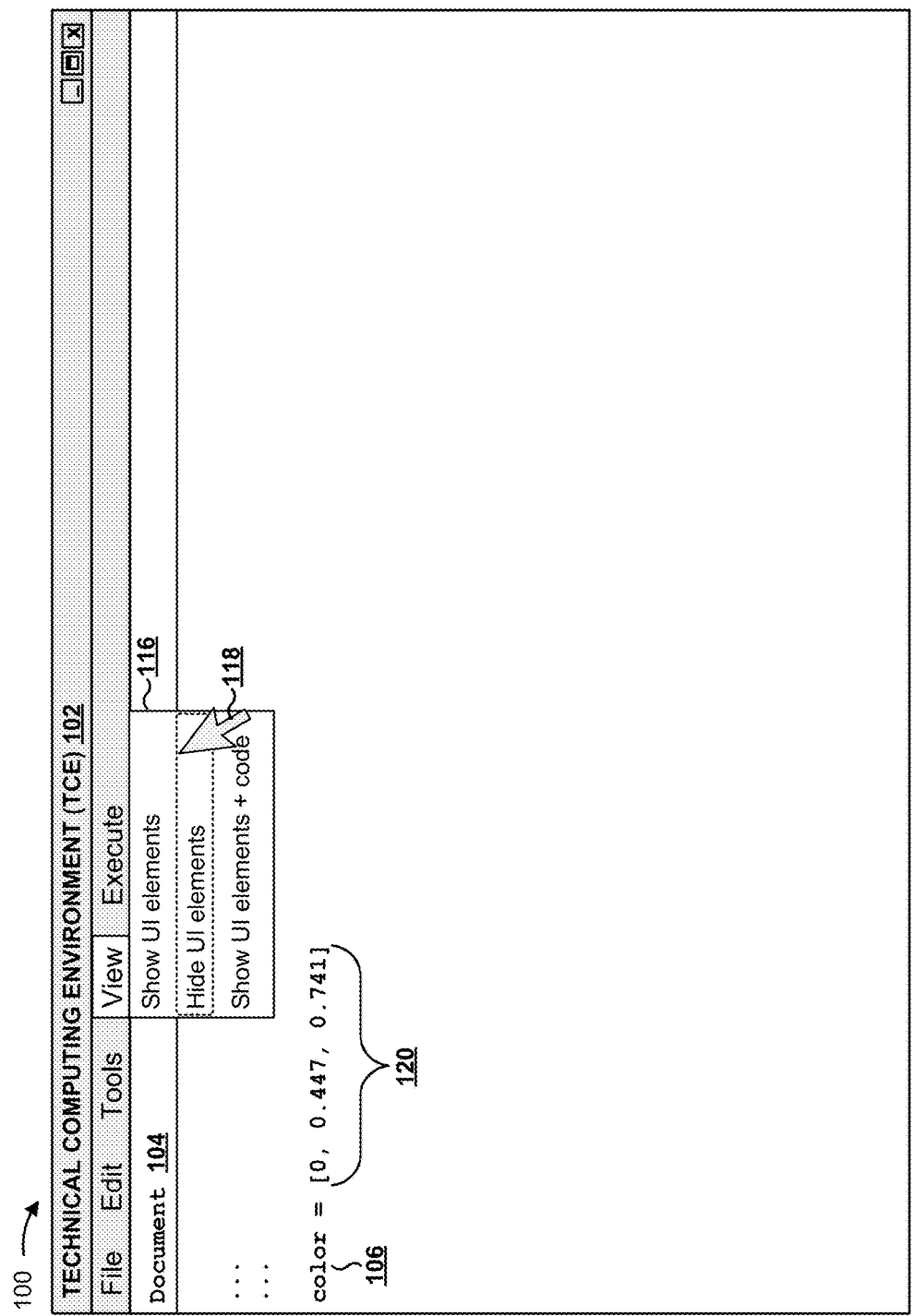

As shown in FIG. 1C, TCE 102 may include one or more input mechanisms, such as a menu 116, one or more menu items of menu 116, or the like, to toggle between providing user interface element 112 in place of generated information (e.g., a code segment), providing user interface element 112 and the generated information, and/or providing generated information and not providing user interface element 112 for display. For example, menu 116 may include a "Show UI elements" menu item, a "Hide UI elements" menu item, and a "Show UI elements+code" menu item. Based on user selection 118 of the "Hide UI elements" menu item, document 104 may display generated information (e.g., code segment 120) in association with code 106. For example, document 104 may display a matrix value of [0, 0.447, 0.741] associated with the variable color (e.g., information associated with the selected state of color picker user interface element 112). Additionally, TCE 102 may not display color picker user element interface 112 based on user selection 118 (e.g., because the user has selected to hide user interface element 112). Any combination of a plaintext (e.g., English) description, code, or user interface element may be shown or hidden, depending on user input.

Figure 1D:
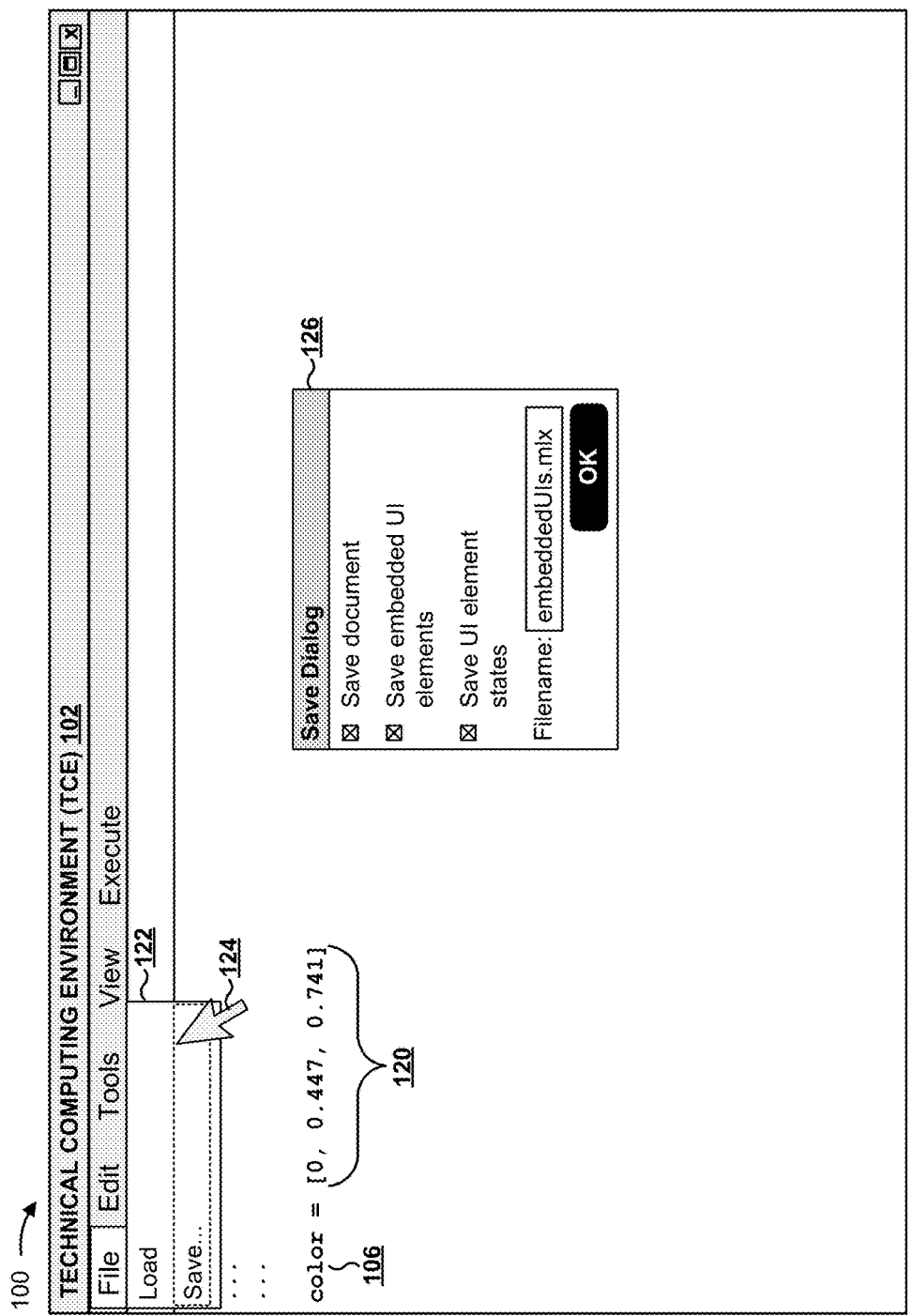

As shown in FIG. 1D, TCE 102 may provide one or more input mechanisms, such as a menu 122, one or more menu items of menu 122, or the like, that may allow a user to save a document 104, save an embedded user interface element 112, and/or save a selected state 114 of an embedded user interface element 112. For example, menu 122 may include a "Load" menu item and a "Save" menu item. Based on user selection 124 of the "Save" menu item, TCE 102 may display a dialog 126 (e.g., a "Save Dialog"). For example, dialog 126 may include one or more input mechanisms, such as one or more checkboxes, that permit a user to select different options for savings document 104. For example, dialog 126 may permit the user to save document 104, to save user interface element 112 (e.g., embedded in document 104), to save a selected state 114 of user interface element 112 (e.g., embedded in document 104), or the like.

In some implementations, user interface element 112 may be persistently stored in document 104. For example, when document 104 is saved, closed, and reopened at a later time, user interface element 112 may exist at the embedded location in reopened document 104. For example, assume that a user saves document 104, an embedded user interface element 112, and a selected state 114 of the user interface element 112 (e.g., by selecting one or more checkboxes of dialog 126). The embedded user interface element 112, the selected state 114 (e.g., the selected color) of user interface element 112, and/or the generated information (e.g., code segment 120) may be persistently stored in document 104. As shown, assume that the file is saved as embeddedUIs.mlx.

In some implementations, user interface element 112 may be embedded in a particular location (e.g., within a stream of executable code or within a program provided for display) in document 104 relative to code included in document 104 (e.g., may be "persistent" in the document). The functionality of user interface element 112 may be based on this location relative to code in document 104. For example, user interface element 112 may be associated with selectable states 114 that are determined based on the location of user interface element 112 within document 104 (e.g., relative to code in document 104). For example, code that precedes user interface element 112 in document 104 may constrain possible states permitted to be associated with code generated by user interface element 112. In this case, selectable states 114 displayed via user interface element 112 may be limited based on such constraints. In this way, user interface element 112 may be automatically customized based on being embedded in document 104 (e.g., in a particular location relative to code from which a code segment generated by user interface element 112 depends). As another example, user interface element 112 may receive input based on code in document 104 (e.g., a variable value, etc.), and may use the input to determine selectable states 114 to be displayed, to generate code, to determine a result of code generation, or the like.

In some implementations, user interface element 112 may not be embedded in document 104 (e.g., may be "floating"). In this case, the selectable states 114 of user interface element 112 may not be constrained by code in document 104. For example, selectable states 114 may include a default set of selectable states when user interface element 112 is not embedded in document 104.

Figure 1E:
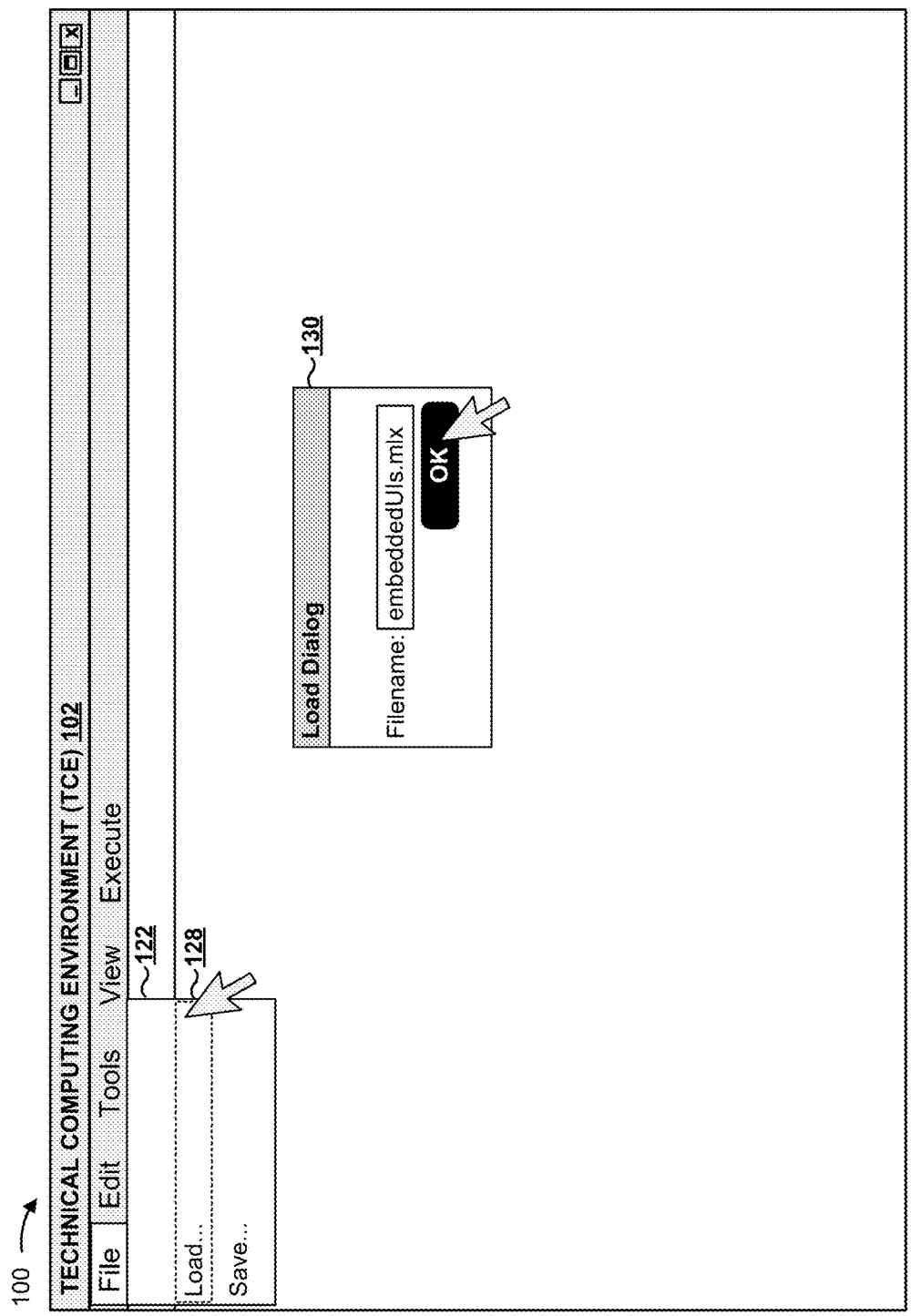

As shown in FIG. 1E, assume that document 104 is closed and reopened at a later time. For example, a user selection 128 of a "Load" menu item from menu 122 may cause a dialog 130 (e.g., a "Load" dialog) to be displayed via TCE 102. Dialog 130 may include a prompt that permits a user to specify a file to load. As shown, assume that the user provides input to cause TCE 102 to load the file named embeddedUIs.mlx.

Figure 1F:
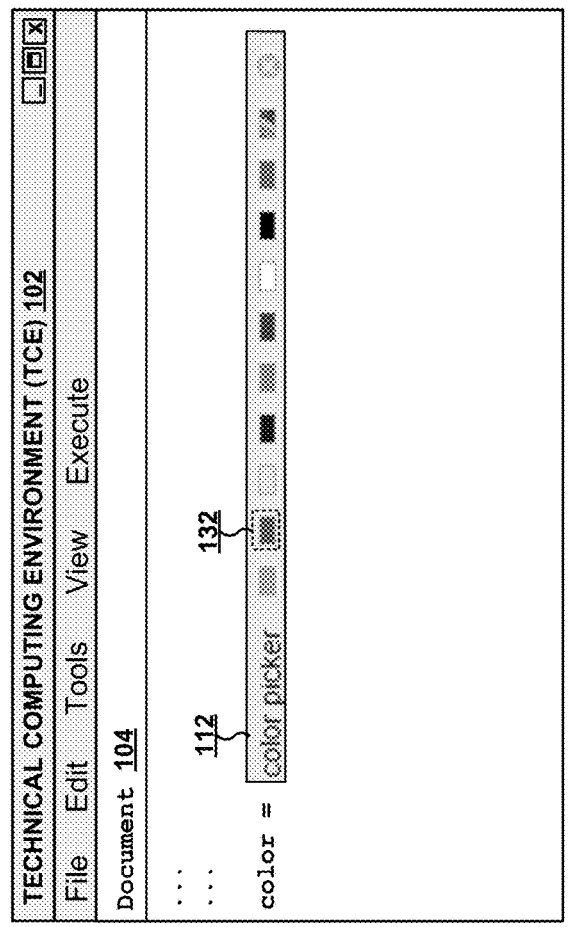

As shown in FIG. 1F, color picker user interface element 112 may be embedded in document 104, and TCE 102 may provide color picker user interface element 112 for display based on loading document 104. For example, TCE 102 may identify color picker user interface element 112 associated with document 104 (e.g., based on serializing and storing color picker user interface element 112 with document 104, followed by deserializing the stored information), and may provide color picker user element 112 for display. Additionally, TCE 102 may load selected state 132 of color picker user interface element 112 when loading document 104, and may provide color picker user interface element 112 and an indication of selected state 132.

Figure 1G:
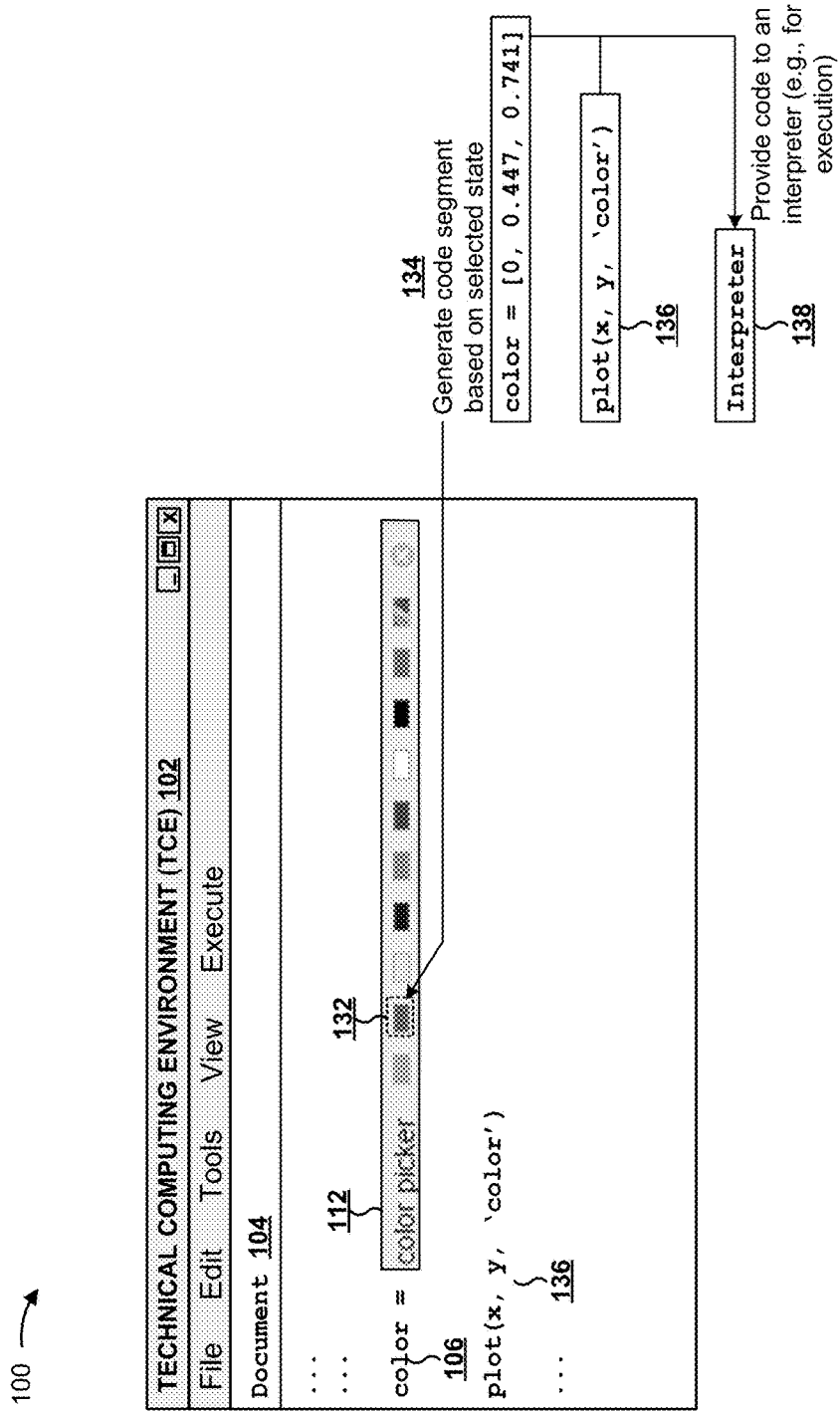

As shown in FIG. 1G, TCE 102 may generate information (e.g., code segment 134, or the like) based on the selected state 132 of color picker user interface element 112. For example, assume that the selected color is represented in code, using a Red, Green, Blue (RGB) color scheme, by a matrix value of [0, 0.447, 0.741]. TCE 102 may generate a code segment to cause the matrix value to be stored by the variable color. For example, TCE 102 may provide code segment 134 and/or other code in document 104 (e.g., a line of code 136 shown as "plot(x, y, 'color')") to interpreter 138 (or to another component for execution). Interpreter 138 may interpret and/or execute code segment 134 and code 136, and may generate a result based on executing code segment 134 and code 136. A device (e.g., a client device, or the like) may provide the result for display (e.g., via a user interface, via a user interface element, via document 104, etc.), or may use the result when executing other code.

In some implementations, code segment 134 may be included in document 104 based on user selection of a state. In some implementations, code segment 134 may be generated, but not initially included in document 104 until a user provides input to include code segment 134 in document 104. For example, TCE 102 may provide, for display, a result of executing code segment 134 (and optionally, other code). The user may view the result, may select a different state to modify the result (based on execution of a different code segment), or the like, until the user is satisfied with the result. In this case, the user may provide input, via TCE 102, that the user is satisfied with the result, which may cause TCE 102 to include the code segment, used to generate the result, in document 104.

Figure 1H:
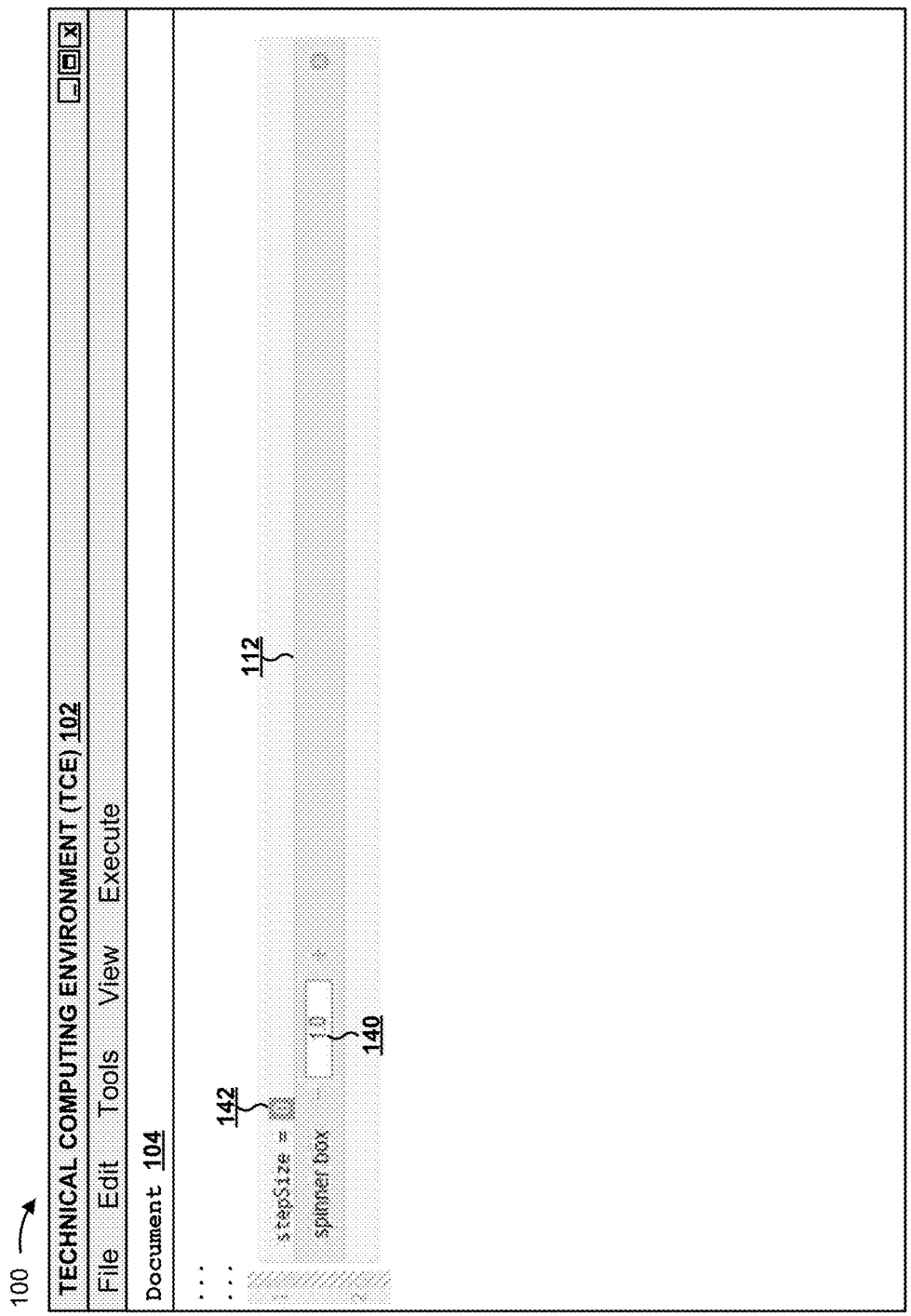

As shown in FIG. 1H, in some implementations, user interface element 112 may be a "single element" user interface element that includes a single element (e.g., a spinner box, a slider, a Boolean value picker, a color map, etc.). In the example shown in FIG. 1H, user interface element 112 includes a spinner box 140 that permits a user to modify a numeric value by interacting with input mechanisms of spinner box 140, such as a minus sign input mechanism to decrement the numeric value, and a plus sign input mechanism to increment the numeric value. Modifying the state of the numeric value in spinner box 140 may cause a literal value 142, included in code, to be modified (e.g., a variable value of a stepSize variable). In other words, user selection of a state (e.g., a numeric value) causes generation of code in document 104. In some implementations, generated code may be persisted in document 104 and/or may overwrite previous code (e.g., code previously input by a user, code that was previously generated by user interface element 112, etc.) In this case, an element of user interface element 112 (e.g., spinner box 140) is paired with a literal value 142 in document 104. Once the user confirms input in spinner box 140 (e.g., showing a value of 1.0), literal value 142 may be updated (e.g., from 0 to 1).

Figure 1I:
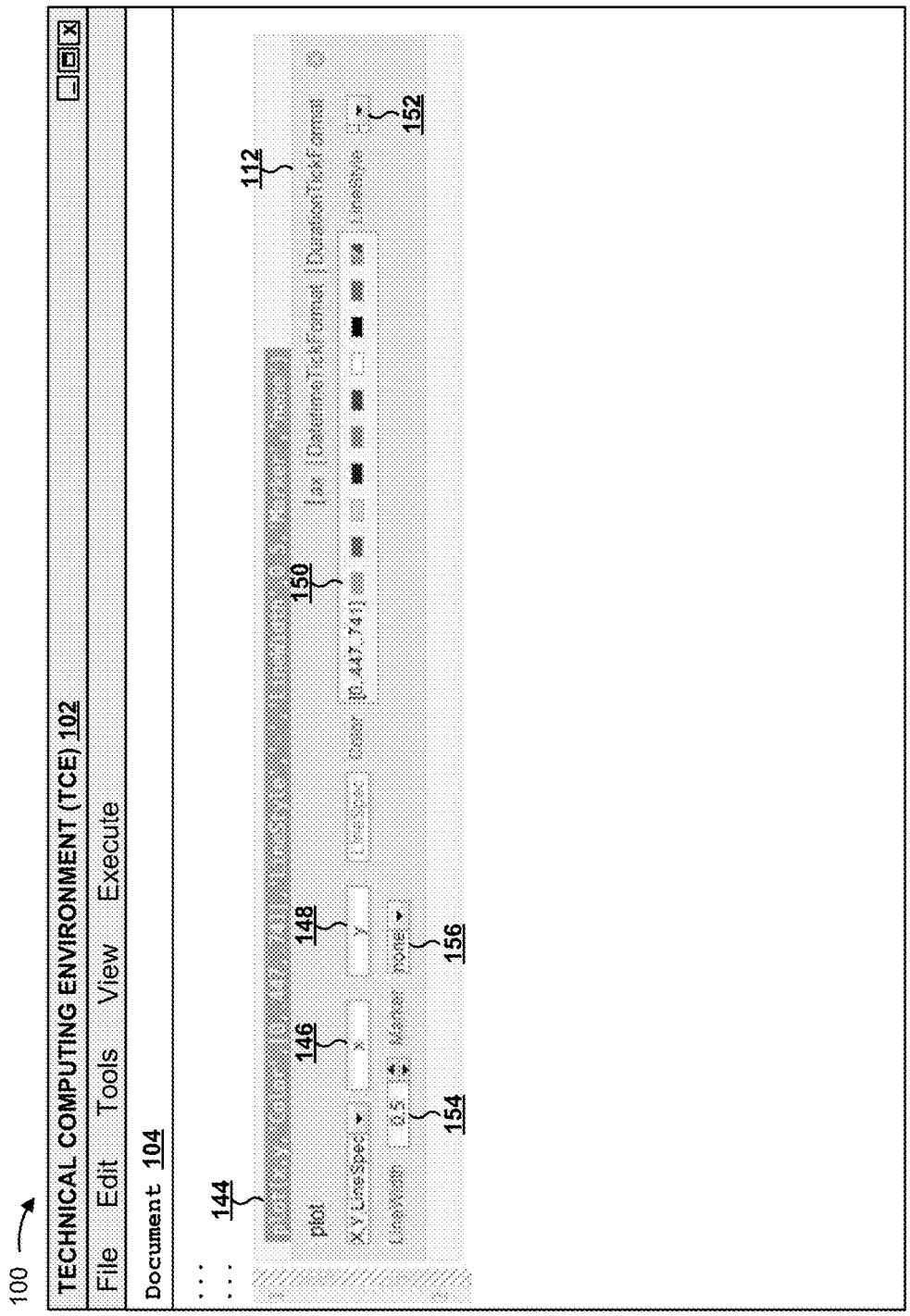

As shown in FIG. 1I, in some implementations, user interface element 112 may be a "many element" user interface element that includes multiple elements. The multiple elements may be laid out automatically and/or may be customized based on user input. In some implementations, the multiple elements may be independent (e.g., selection of a state of a first element does not impact a second element). In this case, each individual element of user interface element 112 may contribute to some part of a value included in document 104, such as an argument of a function 144. For example, assume that function 144 is a plot function with various input arguments. As shown, element 146 of user interface element 112 may specify a value for the first argument of function 144 (e.g., x), element 148 of user interface element 112 may specify a value for the second argument of function 144 (e.g., y), element 150 of user interface element 112 may specify a value for the fourth argument of function 144 (e.g., [0, 0.447, 0.741], which corresponds to a Color), element 152 of user interface element 112 may specify a value for the sixth argument of function 144 (e.g., a minus sign, which corresponds to a LineStyle), element 154 of user interface element 112 may specify a value for the eighth argument of function 144 (e.g., 0.5, which corresponds to a LineWidth), and element 156 of user interface element 112 may specify a value for the tenth argument of function 144 (e.g., 'none', which corresponds to a Marker).

Figure 1J:
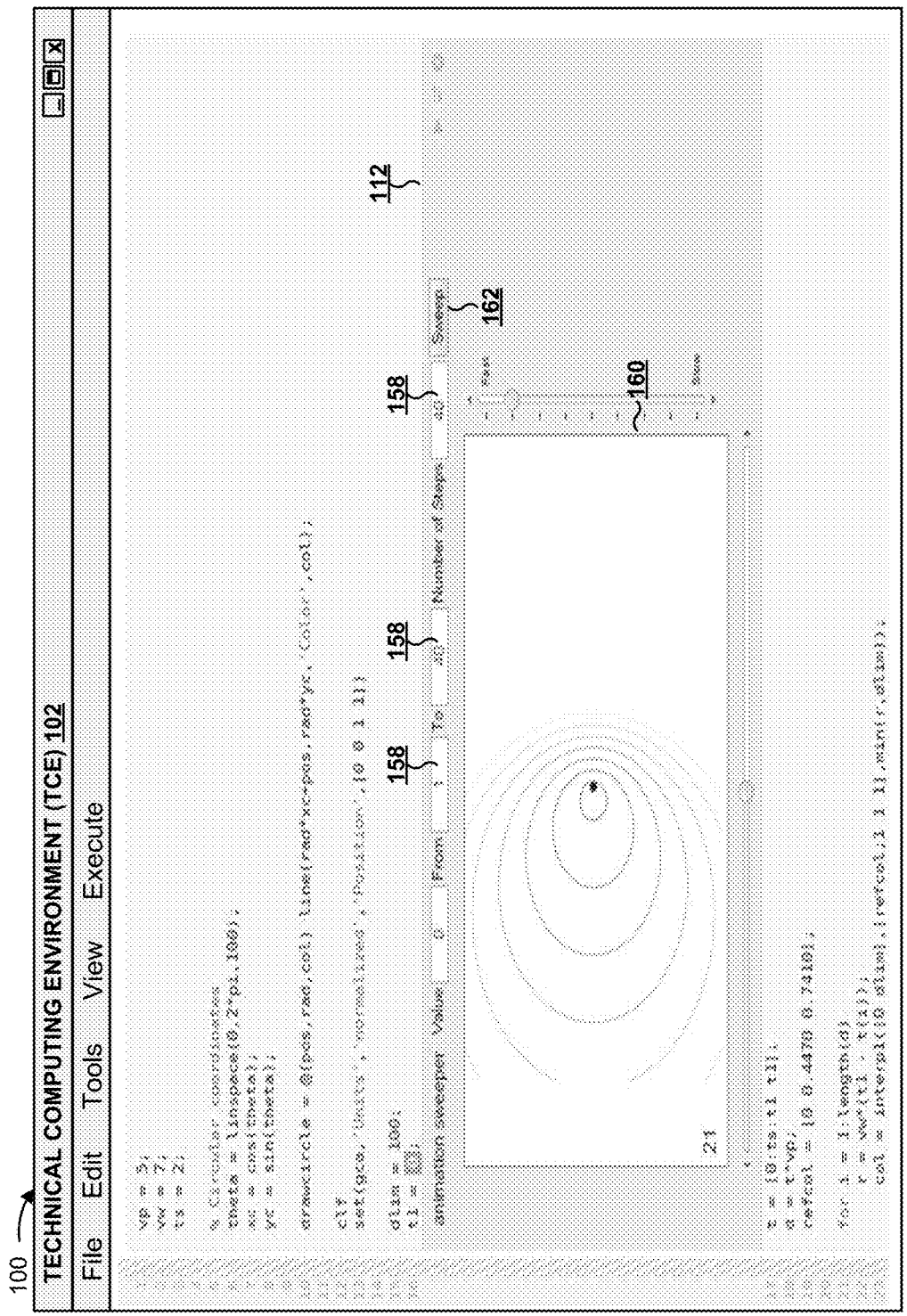

As shown in FIG. 1J, in some implementations, user interface element 112 may be a "complex element" user interface element. In some implementations, the values set in the elements 158 of user interface element 112 may or may not change code that exists in document 104 (e.g., in-band code). In some implementations, the values may be used in out-of-band code that is executed to generate a result 160. In the example shown in FIG. 1J, when the user clicks Sweep button 162, the values put in elements 158 (e.g., shown as From, To, and Number of Steps) may be populated into a code template. The code template may include out-of-band code associated with user interface element 112, and/or may include values that are populated based on content included in document 104 (e.g., based on in-band code). The out-of-band code may be executed separately from the in-band code, and execution of the out-of-band code may produce result 160. In this case, result 160 includes a set of figures that form an interactive animation operated via user interface element 112. In this way, the user may use result 160 to identify values to be included in the in-band code of code document 104.

In this way, implementations described herein may simplify the creation of code by providing user-friendly user interface elements with which a user can interact to cause code generation, rather than requiring the user to write the code. This may increase the speed and accuracy with which computer programs can be written. Furthermore, implementations described herein may generate code more efficiently than if a user writes the code, thereby conserving computing resources, such as processing power, memory, or the like. For example, if the user writes the code, the code may include various errors (e.g., syntax errors, formatting errors, etc.), may have inefficient execution characteristics, or the like. By permitting the user to interact with a user interface element that generates the code, the client device can generate code that includes fewer errors, that has more efficient execution characteristics, etc. than if the user wrote the code. Furthermore, a user may specify a desired functionality without having to learn how to produce the code required to achieve that functionality, which may be difficult and time-consuming.

As indicated above, FIGS. 1A-1J are provided merely as examples. Other examples are possible and may differ from what was described in connection with FIGS. 1A-1J.

Figure 2:
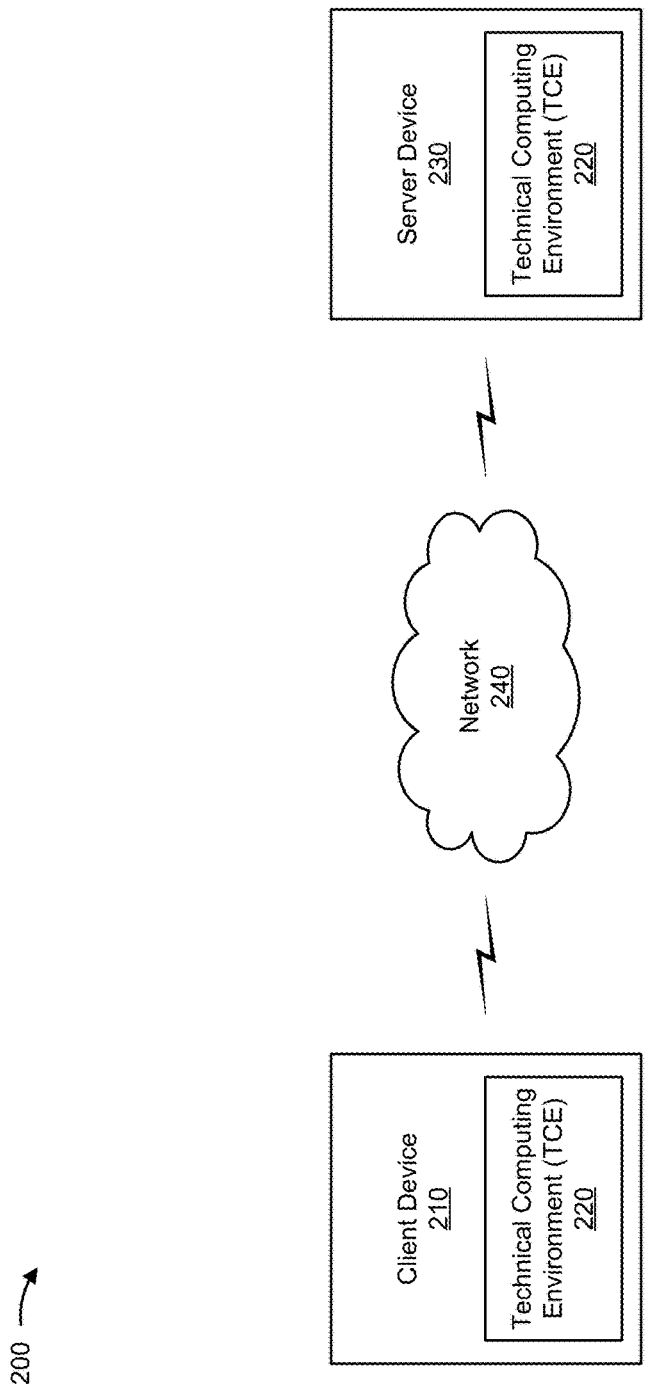
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, executing, and/or providing code and/or information associated with code (e.g., a document containing code, a code segment, a user interface element, etc.). For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230 (e.g., code and/or information associated with code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include a user interface that permits a user to create and/or modify documents containing code. For example, TCE 220 may provide a code editor that permits a user to create and/or modify documents containing code. In some implementations, TCE 220 may permit the user to create and/or modify code by inputting the code as text. Additionally, or alternatively, TCE 220 may provide one or more user interface elements (e.g., within the document containing code), and the user may interact with the user interface element(s) to cause TCE 220 to generate code. For example, the user may interact with a user interface element to select a state of the user interface element, and TCE 220 may generate code based on the selected state of the user interface element.

Server device 230 may include one or more devices capable of receiving, generating, storing, processing, executing, and/or providing code and/or information associated with code. For example, server device 230 may include a computing device, such as a server, a desktop computer, a laptop computer, a tablet computer, a cloud-based computing device, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
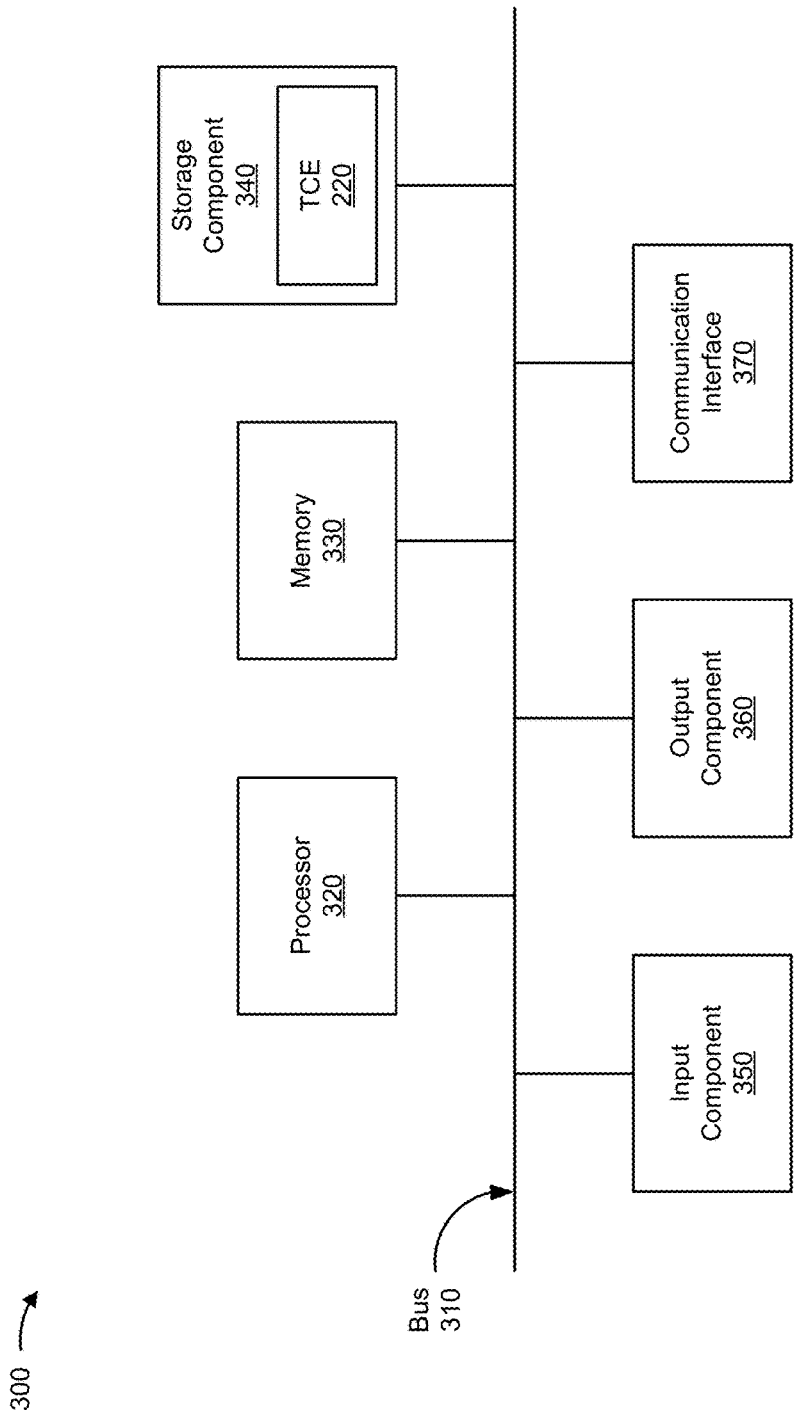
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a touch pad, a keyboard, a keypad, a mouse, a button, a switch, a microphone, an input method editor (IME), a software keyboard for a particular operating system, such as Android, iOS, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
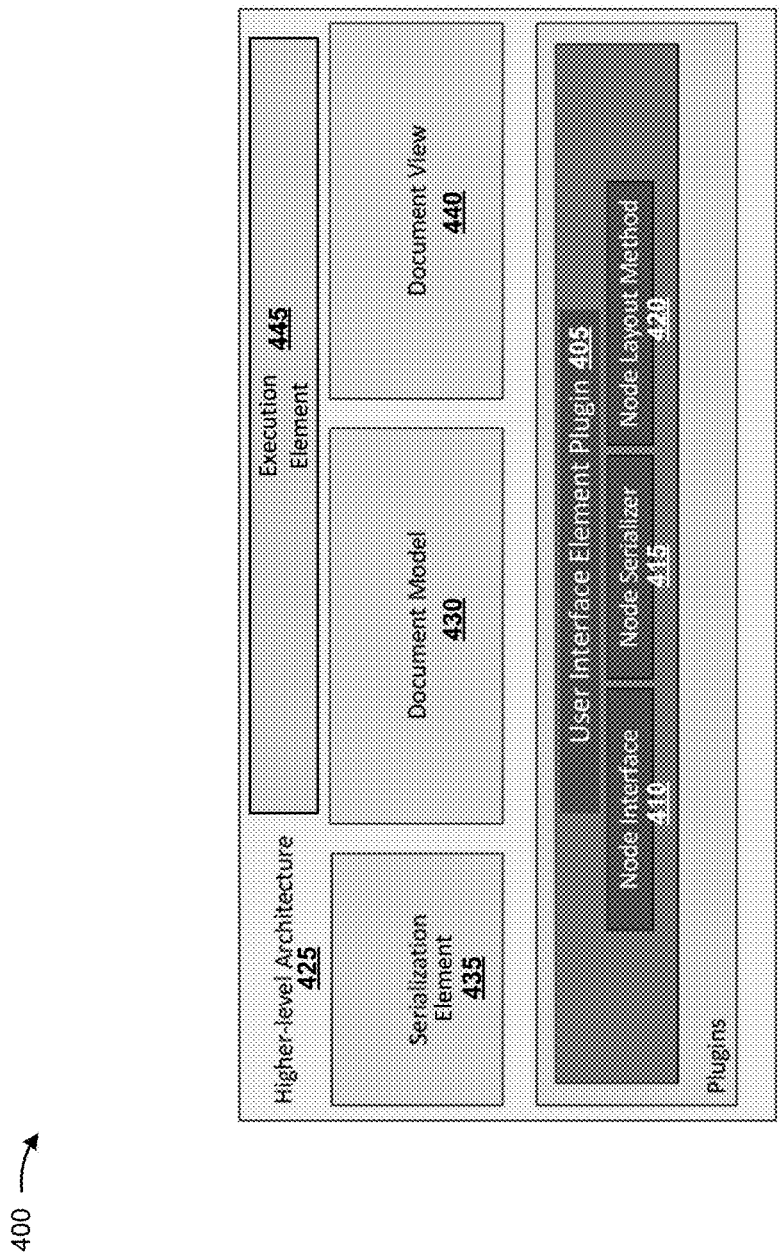
FIGS. 4 and 5 are diagrams of example architectures in which systems and/or methods, described herein, may be implemented.

FIG. 4 is a diagram of an example architecture 400 in which systems and/or methods, described herein, may be implemented. FIG. 4 shows an example of a user interface element plugin 405 that may be included in architecture 400. As shown, user interface element plugin 405 may include a node interface element 410, a node serializer element 415, and a node layout method 420.

Node interface element 410 may include code for evaluation. The code may be obtained from user interface element plugin 405 in order to execute the code.

Node serializer element 415 may be used to store attributes of a user interface element (e.g., visual attributes, states of the user interface element, code associated with the user interface element, etc.) in association with a document containing code. For example, node serializer element 415 may convert attributes and/or information associated with a user interface element to a string for storage (e.g., persistent storage with the document containing code). Upon loading a document containing code, the string may be deserialized to reproduce the user interface element and/or information associated with the user interface element.

Node layout method 420 may produce user interface views for a user interface element (e.g., during design time, when a layout is updated, etc.). In this way, code presentation may be separated from code execution (e.g., using node interface element 410 and node layout method 420). This may permit decoupling of a user interface element from a code segment generated via the user interface element, which further permits a user interface element to be provided for display, while a code segment generated via the user interface element is provided for execution (e.g., separately from the user interface element). However, a relationship between the user interface element and the code segment may be maintained (e.g., using an interface between node interface element 410 and node layout method 420).

As further shown in FIG. 4, user interface element plugin 405 may communicate with a higher-level architecture 425, which may include a document model 430, a serialization element 435, a document view 440, and an execution element 445.

Document model 430 may include one or more nodes, and may define how a node can be altered. A node may refer to a run-time object stored in memory. Serialization element 435 may store a node, in any format, by mapping the contents of the node to memory (e.g., an available storage medium). Document view 440 may provide a node for presentation (e.g., via a display). In some implementations, document view 440 may be responsible for rendering information via a user interface so that other subsystems need not store information regarding how to render the node. For example, document view 440 may define information that is contributed to view elements, such as a document object model (DOM). Execution element 445 may define what a node represents in terms of code for execution. In other words, execution element 445 may define code for the node.

In some implementations, document view 440 and execution element 445 may separate presentation of information (e.g., a generated code segment, or the like) from code execution, thereby permitting decoupling of a user interface element from a code segment generated via the user interface element. This may permit a user interface element to be provided for display, while a code segment generated via the user interface element is provided for execution (e.g., separately from the user interface element).

As indicated above, FIG. 4 is provided merely as an example. Other examples are possible and may differ from what was described with regard to FIG. 4.

Figure 5:
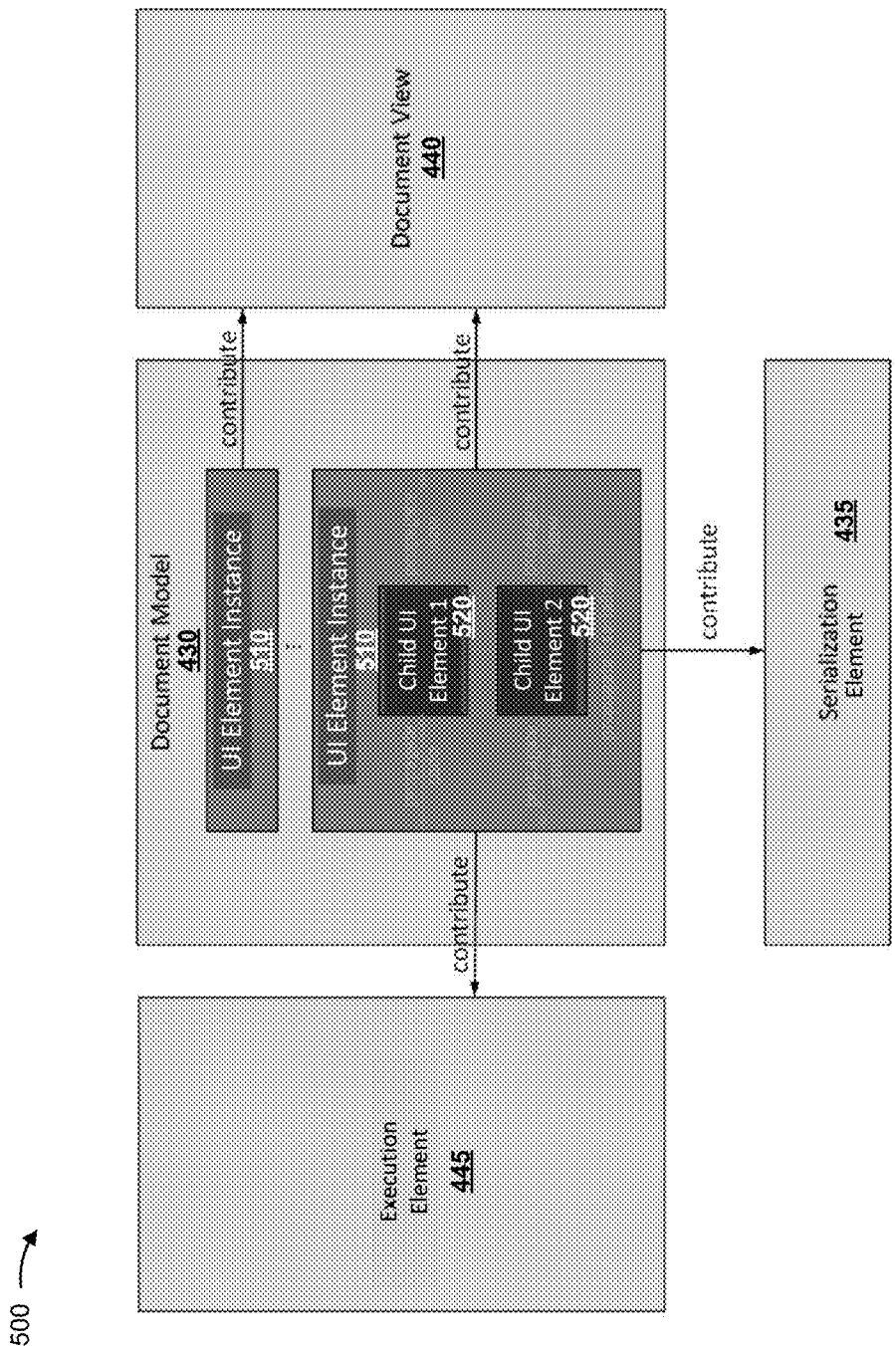

FIG. 5 is a diagram of an example architecture 500 in which systems and/or methods, described herein, may be implemented. As shown, architecture 500 may include one or more user interface element instances 510. The user interface element instances 510 may be included in document model 430, and may contribute information to serialization element 435, document view 440, and/or execution element 445. For example, serialization element 435 may use information associated with user interface element instance 510 to store a user interface element, a selected state of the user interface element, a document in which the user interface element is embedded, or the like. As another example, document view 440 may use information associated with user interface element instance 510 to provide information for display (e.g., a user interface element, an indication of a selected state, code generated by the user interface element, etc.). As another example, execution element 445 may use information associated with user interface element instance 510 to execute code generated via a user interface element.

In some implementations, user interface element instance 510 may include other user interface element instances 520 in a hierarchical (e.g., parent-child) relationship. For example, a parent user interface element may include two or more child user interface elements. The child user interface elements may be combined in different ways to build different parent user interface elements, which permits code reuse. Additional details regarding operation and use of user interface elements are provided below.

As indicated above, FIG. 5 is provided merely as an example. Other examples are possible and may differ from what was described with regard to FIG. 5.

FIG. 6 is a flow chart of an example process 600 for embedding user interface elements in documents containing code. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving information associated with a user interface element (block 610). For example, client device 210 may receive information associated with a user interface element (e.g., from a user interface element plugin). The information may include one or more attributes of the user interface element. For example, the information may indicate a manner in which the user interface element is to be rendered for display. In some implementations, a user may provide input via a code editor, and client device 210 may obtain information associated with a user interface element relating to the input. Additionally, or alternatively, client device 210 may receive information associated with a user interface element from a user interface element plugin.

In some implementations, the information may identify one or more selectable states (e.g., adjustable states) associated with the user interface element. For example, the user interface element may be associated with multiple selectable states, such that a user may interact with the user interface element (e.g., via a user interface, a document, etc.) to select a selectable state. Additionally, or alternatively, the information may include code segments associated with the selectable states. For example, each selectable state may correspond to a code segment capable of being generated via the user interface element. Different selectable states may correspond to different code segments. In this way, when a user interacts with the user interface element to select a state, client device 210 may generate the code segment corresponding to the selected state, as described in more detail below.

In some implementations, an attribute of the user interface element may depend on a type of the user interface element. For example, the user interface element may include a slider bar with a minimum value and a maximum value. In this case, the minimum value and the maximum value may be attributes of the user interface element. Examples of user interface elements include a numeric slider, a color map, a color picker, a spinner box, a text box, an animation sweeper, a loader, a Boolean value picker, a code area, a Hilbert FIR filter, an image filter, an image thresholder, or the like. In some implementations, the user interface element may be a "single widget" user interface element that includes a single element (e.g., a slider, a Boolean value picker, a color map, etc.). Additionally, or alternatively, the user interface element may be a "many widget" user interface element that includes multiple elements. The multiple elements may be laid out automatically and/or may be customized based on user input. In some implementations, the multiple elements may be independent (e.g., selection of a state of a first element does not impact a second element). In some implementations, two or more elements of a user interface element may share a dependency (e.g., in a "complex widget" user interface element). For example, selection of a state associated with a first element of the user interface element may modify a set of valid selectable states for a second element of the user interface element (e.g., by executing out-of-band code that executes during edit-time to modify the user interface element, but that is not part of the in-band code of the document that executes during runtime).

As further shown in FIG. 6, process 600 may include providing the user interface element for display within a document containing code (block 620). For example, client device 210 may provide the user interface element for display within a document. The document may include code or other executable content. Additionally, or alternatively, the document may include non-code, such as textual non-code (e.g., comments, rich text, etc.), graphical non-code (e.g., a user interface element), or the like. In some implementations, the document may be created and/or modified using a code editor, which may be included in TCE 220. In some implementations, client device 210 may provide the user interface element for display (e.g., in a code editor) when the document is rendered for display.

In some implementations, client device 210 may provide the user interface element for display based on one or more triggers. For example, client device 210 may detect a user interaction with an input mechanism (e.g., a button, a menu item, etc.), and may provide the user interface element for display based on the user interaction. In some implementations, the user may select a particular type of user interface element, and client device 210 may provide the selected type of user interface element for display. In some implementations, TCE 220 may be configured to include one or more user interface elements, and the user may select one of these interface elements to be provided for display to assist the user with code generation.

Additionally, or alternatively, client device 210 may infer, based on a set of rules, that a user interface element is to be provided. For example, the user may type a particular string of characters, may input particular code, or the like, that satisfies a set of rules. Client device 210 may provide the user interface element for display based on the set of rules being satisfied. In some implementations, different types of user interface elements (e.g., associated with different states and that generate different code segments) may correspond to different sets of rules.

Additionally, or alternatively, client device 210 may provide a user interface element for display based on loading a document that includes a user interface element. For example, client device 210 (or another device) may save a document that includes a user interface element, and client device 210 may load the document at a later time. In this case, client device 210 may identify the user interface element associated with the document (e.g., based on serializing and storing the user interface element with the document, followed by deserializing the stored information), and may provide the user interface element for display.

In some implementations, client device 210 may save a selected state of the user interface element, as described in more detail below. In this case, client device 210 may load the selected state when loading the document, and may provide the user interface element and an indication of the selected state of the user interface element.

In some implementations, client device 210 may provide the user interface element, within a document, in-line with code included in the document. For example, assume that a document includes a first code segment, such as a first line of code, and a second code segment, such as a second line of code. Assume further that the second code segment was generated via a user interface element. In this case, client device 210 may provide the first code segment for display (e.g., as text) on a first line, and may provide the user interface element, used to generate the second code segment, on a second line. In some implementations, client device 210 may provide the user interface element in place of the second code segment. In some implementations, client device 210 may provide the user interface element and the second code segment. Additionally, or alternatively, client device 210 may provide an input mechanism to toggle between providing the user interface element in place of a code segment, providing the user interface element and the code segment, and/or providing the code segment and not the user interface element. In this way, the user interface element may be used to represent a corresponding code segment in the document.

In some implementations, the user interface element may represent a single item for navigation purposes. In this case, when navigating the document, the user may move (e.g., a cursor) from one end of the user interface element to the other end of the user interface element using a single keystroke, mouse click, or the like.

In some implementations, client device 210 may execute helper code that indicates a result associated with selecting a particular state of the user interface element. In this case, client device 210 may provide the result for display (e.g., via the user interface element, in association with the user interface element, etc.) to assist a user with selecting a state of the user interface element.

As further shown in FIG. 6, process 600 may include detecting a user interaction with the user interface element (block 630), and determining, based on the user interaction, a selected state of the user interface element (block 640). For example, client device 210 may detect a user interaction with the user interface element. In some implementations, the user interface element may provide one or more input mechanisms that permit the user to interact with the user interface element to select a state from multiple selectable states of the user interface element. The user may interact with the input mechanism to select a state. Based on the user interaction, client device 210 may determine a selected state of the user interface element.

As further shown in FIG. 6, process 600 may include generating a code segment based on the selected state of the user interface element (block 650), and providing the code segment for execution (block 660). For example, client device 210 may generate a code segment using the selected state of the user interface element, and may provide the generated code segment. In some implementations, each state of the user interface element may correspond to a different code segment. Client device 210 may generate a code segment based on the selected state of the user interface element. In some implementations, client device 210 may receive the code segment from a code node of a user interface element plugin.

In some implementations, client device 210 may generate executable content. Additionally, or alternatively, client device 210 may store and/or provide executable content (e.g., with or without generating the executable content). For example, a user interface element may include a segment of compiled binary code that indicates an action for the user interface element (e.g., an action to be performed by the user interface element, such as when the binary code is executed). In some implementations, the binary code may be generating by compiling some other code input by a user. In this case, the user interface element may store the binary code (e.g., despite not generating the binary code), and may make the binary code available when TCE 220 is to execute the user interface element.

In some implementations, client device 210 may provide the generated code segment. For example, client device 210 may provide the code segment for execution, such as by providing the code segment to a component that executes code or prepares code for execution, such as an interpreter, a compiler, or the like. The component may interpret the code segment, and may execute the interpreted code segment. In some implementations, the component may be included in client device 210. The component may generate a result based on executing the code, and may provide the result. Client device 210 may provide the result for display (e.g., via a user interface, via a user interface element, via a document, etc.).

In some implementations, client device 210 may provide the generated code segment without providing other code included in the document. In this case, client device 210 may provide a result of executing the code segment for display in association with the user interface element used to generate the code segment. In this way, a user may see a result of executing the code segment based on the state selected by the user.

In some implementations, client device 210 may provide the generated code segment for execution, and may also provide other code, included in the document, for execution. In some implementations, there may be a relationship between the generated code segment and the other code. For example, there may be a sequential relationship between the generated code segment and the other code. The sequential relationship may indicate an order in which the code is to be executed (e.g., whether the generated code segment is to be executed before or after the other code). Additionally, or alternatively, there may be a dependency relationship between the generated code segment and the other code. For example, the generated code may depend on the other code (e.g., may include a variable with a value that depends on the other code, etc.), or vice versa. Client device 210 may determine the relationship between the generated code segment and the other code, and may provide the code for execution based on the relationship.

In some implementations, client device 210 may determine a relationship between the generated code segment and the other code based on a location of the user interface element, corresponding to the generated code segment, within the document (e.g., in relation to the other code). For example, the user interface element may replace the code segment in the document at a particular location, and client device 210 may use the particular location to determine a relationship between the code segment and other code in the document.

In some implementations, client device 210 may provide the code segment and the other code to a component for execution. The component may execute the code segment and the other code, and may generate a result based on executing the code segment and the other code. Client device 210 may provide the result for display (e.g., via a user interface, via a user interface element, via a document, etc.), or may use the result when executing other code.

In some implementations, client device 210 may provide the code segment and/or the other code for execution based on detecting a user interaction with the user interface element. For example, a user may select a state of the user interface element, which may cause client device 210 to generate a code segment, corresponding to the selected state, and to provide the code segment and/or the other code for execution. In some implementations, the user interface element may use helper code to assist a user with selecting a state of the user interface element, as described above. In some implementations, client device 210 may not provide out of band code (e.g., helper code) for execution when providing the code segment and/or the other code for execution.

In some implementations, selection of a state of the user interface element may take place during edit-time, and execution of the code may take place during run-time. By separating edit-time events from run-time events, client device 210 may conserve computing resources, such as memory resources, processing resources, or the like. In some implementations, code (e.g., intermediate code, out-of-band code, helper code, etc.) may be executed during edit-time, and a result of this execution may be stored in association with the user interface element and/or the document. During run-time, the result may be used (e.g., during execution of in-band code), thereby conserving processing resources and resulting in faster run-time execution.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein may simplify the creation of code by providing user-friendly user interface elements with which a computer programmer can interact to cause code generation. Furthermore, implementations described herein may generate code more efficiently than if a user writes the code, thereby conserving computing resources, such as processing power, memory, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, code is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, code may include different combinations of the above-identified classes of code (e.g., text-based code, binary code, text files, source code, machine code, etc.). Additionally, or alternatively, code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
providing a user interface element for display in association with a document, that includes code, provided for display,
the user interface element being associated with two or more selectable states capable of being selected via the user interface element,
the providing the user interface element being performed by one or more devices;
determining a selected state of the two or more selectable states,
the determining being performed by the one or more devices;
providing code or other executable content based on the selected state,
the providing being performed by the one or more devices; and
storing the user interface element, the selected state, and the provided code or other executable content in association with the document,
the storing being performed by the one or more devices.

2. The method of claim 1, where each of the two or more selectable states, when selected, causes generation of a different code segment.

3. The method of claim 1, where the code or other executable content includes a code segment; and
where the method further comprises:
providing the code segment for execution.

4. The method of claim 3, where providing the code segment comprises:
providing the code segment and one or more other code segments, included in the document, for execution,
the code segment and the one or more other code segments being executed based on a relationship between the code segment and the one or more other code segments within the document.

5. The method of claim 1, where the code or other executable content includes a code segment; and
where providing the user interface element for display comprises:
providing the user interface element for display in place of the code segment.

6. The method of claim 1, where providing the user interface element for display comprises:
inferring a type of user interface element to be provided for display; and
providing the user interface element for display based on inferring the type of user interface element to be provided for display,
the user interface element being of the type.

7. The method of claim 1, where each of the two or more selectable states corresponds to information that is capable of being generated via the user interface element.

8. A method, comprising:
in response to an event taking place in association with a document that contains first code, providing, by one or more processors, one or more user interface elements for display;
receiving, by the one or more processors, an indication that a selected user interface element of the one or more user interface elements is to be associated with the first code of the document, the selected user interface element representing a functionality to be performed in connection with the first code, and the selected user interface element being associated with two or more selectable states;
generating, by the one or more processors and based on a selected state of the two or more selectable states, information for the selected user interface element without the selected user interface element performing the functionality in connection with the first code; and
persistently storing, by the one or more processors, an association between the selected user interface element, the first code, and the generated information.

9. The method of claim 8, further comprising displaying the selected user interface element in the document without displaying the generated information.

10. The method of claim 9, further comprising in response to another event taking place in association with the selected user interface element, displaying the generated information in replacement of the selected user interface element in the document.

11. The method of claim 8, wherein the information comprises second code or other executable content.

12. The method of claim 8, further comprising detecting, by the one or more processors, the event.

13. The method of claim 8, wherein the event comprises at least one of:
a user interaction, or
input of the first code.

14. The method of claim 8, where the selected user interface element includes at least one of:
a single element user interface element,
a multiple element user interface element, or
a complex user interface element.

15. The method of claim 8, wherein the generated information includes a result of executing code during edit-time; and
wherein the result is stored.

16. A non-transitory computer-readable medium storing instructions, the instructions comprising:
one or more instructions that, when executed by one or more processors, cause the one or more processors to:
provide a user interface element for display within a document that includes code,
the user interface element being associated with two or more selectable states capable of being selected via the user interface element;
detect a user interaction with the user interface element;
determine, based on the user interaction, a selected state of the two or more selectable states;
generate information based on the selected state; and
save the information, the user interface element, and the selected state in association with the document.

17. The non-transitory computer-readable medium of claim 16, where the one or more instructions, that cause the one or more processors to provide the user interface element for display, cause the one or more processors to:
execute helper code that indicates a result associated with the selected state; and
provide the result via the user interface element.

18. The non-transitory computer-readable medium of claim 16, where the one or more instructions, when executed by the one or more processors, further cause the one or more processors to:
provide the information for execution.

19. The non-transitory computer-readable medium of claim 18, where the one or more instructions, that cause the one or more processors to provide the information, cause the one or more processors to:
provide the information without providing helper code that indicates a result associated with the selected state.

20. The non-transitory computer-readable medium of claim 18, where the one or more instructions, that cause the one or more processors to provide the information, cause the one or more processors to:
   provide the information without providing the user interface element.

* * * * *